(12) United States Patent
Carpio Obre et al.

(10) Patent No.: US 11,996,796 B2
(45) Date of Patent: May 28, 2024

(54) SUPPORT CONNECTOR, SOLAR PANEL CONNECTOR ATTACHABLE TO THE SUPPORT CONNECTOR, AND ATTACHING SYSTEM COMPRISING SAID SUPPORT CONNECTOR AND SAID SOLAR PANEL CONNECTOR

(71) Applicant: SOLTEC INNOVATIONS, S.L., Molina de Segura (ES)

(72) Inventors: Francisco Javier Carpio Obre, Molina de Segura (ES); Pablo Sánchez Huertas, Molina de Segura (ES)

(73) Assignee: SOLTEC INNOVATIONS, S.L., Molina de Segura (ES)

( * ) Notice: Subject to any disclaimer, the term of this patent is extended or adjusted under 35 U.S.C. 154(b) by 0 days.

(21) Appl. No.: 18/227,282

(22) Filed: Jul. 27, 2023

(65) Prior Publication Data
US 2023/0370012 A1 Nov. 16, 2023

Related U.S. Application Data

(62) Division of application No. 17/628,126, filed as application No. PCT/ES2020/070462 on Jul. 16, 2020, now Pat. No. 11,770,096.

(30) Foreign Application Priority Data

Jul. 16, 2019 (EP) ..................... 19382598

(51) Int. Cl.
*H02S 20/10* (2014.01)
*H02S 20/32* (2014.01)
*H02S 30/10* (2014.01)

(52) U.S. Cl.
CPC .............. *H02S 20/10* (2014.12); *H02S 20/32* (2014.12); *H02S 30/10* (2014.12)

(58) Field of Classification Search
CPC .......... H02S 20/10; H02S 20/32; H02S 30/10
See application file for complete search history.

(56) References Cited

U.S. PATENT DOCUMENTS

| 2003/0070368 A1* | 4/2003 | Shingleton .............. F24S 25/33 52/173.3 |
| 2004/0221524 A1 | 11/2004 | Poddany et al. |

(Continued)

FOREIGN PATENT DOCUMENTS

| DE | 8715256 U1 | 3/1988 |
| EP | 2017554 A2 | 1/2009 |

(Continued)

OTHER PUBLICATIONS

International Search Report issued by European Patent Office dated Nov. 3, 2020 in related patent application PCT/ES2020/070462, official translation provided.

(Continued)

*Primary Examiner* — Jayne L Mershon
(74) *Attorney, Agent, or Firm* — Hassan Abbas Shakir; Shakir Law PLLC

(57) ABSTRACT

A system for attaching a solar panel to a support, includes a support connector and a solar panel connector, where the support connector includes a U-shaped profile having a lower wall and two side walls, where an upper end of the side walls is bent inwards to provide vertical rails for receiving the panel connector; and the panel connector include a profile having: an upper C-shaped portion configured for receiving a side edge of a solar panel; a lower, upwardly oriented channel portion configured for receiving the vertical rail of the support connector; and at least one box-shaped portion connecting the upper C-shaped portion and the lower channel portion.

4 Claims, 5 Drawing Sheets

(56) References Cited

U.S. PATENT DOCUMENTS

| | | |
|---|---|---|
| 2008/0095591 A1 | 4/2008 | Wu |
| 2010/0018571 A1 | 1/2010 | Placer |
| 2010/0154784 A1 | 6/2010 | King et al. |
| 2011/0100434 A1 | 5/2011 | Van Walraven |
| 2012/0074079 A1 | 3/2012 | Marley |
| 2013/0048056 A1* | 2/2013 | Kilgore .................. H02S 20/24 |
| | | 136/251 |
| 2016/0204732 A1 | 7/2016 | Thomas |
| 2017/0040928 A1 | 2/2017 | Schuit et al. |

FOREIGN PATENT DOCUMENTS

| | | |
|---|---|---|
| EP | 2148154 A2 | 1/2010 |
| EP | 2362429 A2 | 8/2011 |
| FR | 2960046 A1 | 11/2011 |
| WO | 2009091238 A1 | 7/2009 |

OTHER PUBLICATIONS

Written Opinion by the International Search Authority issued by European Patent Office uploaded to WIPO Patentscope dated Mar. 17, 2021 in related patent application PCT/ES2020/070462, in English.
Written Opinion by the International Search Authority (replaced) issued by European Patent Office uploaded to WIPO Patentscope dated Jan. 21, 2021 in related patent application PCT/ES2020/070462, in English.

* cited by examiner

SUPPORT CONNECTOR, SOLAR PANEL CONNECTOR ATTACHABLE TO THE SUPPORT CONNECTOR, AND ATTACHING SYSTEM COMPRISING SAID SUPPORT CONNECTOR AND SAID SOLAR PANEL CONNECTOR

CROSS-REFERENCE TO RELATED APPLICATIONS

This application is a divisional application of and claims priority to patent application U.S. Ser. No. 17/628,126, which was filed on Jan. 18, 2022, which is pending, and which is hereby incorporated by reference in its entirety for all purposes.

U.S. Ser. No. 17/628,126 is a National Stage Entry of and claims priority to patent application PCT/ES2020/070462, which was filed on Jul. 16, 2020 and which is hereby incorporated by reference in its entirety for all purposes.

Patent application PCT/ES2020/070462 is an international application of and claims priority to European Patent Application 19382598.1, which was filed Jul. 16, 2019 and which is hereby incorporated by reference in its entirety for all purposes.

OBJECT OF THE INVENTION

The present invention generally belongs to the field of solar energy, and more particularly to the mechanical assemblies used to attach a solar panel to a support structure.

A first object of the present invention is a system for attaching a solar panel to a support structure that comprises a support connector and a solar panel connector.

A second object of the present invention is directed to the above support connector configured for attachment to a support structure, where the support connector is slidably connectable to a particularly designed solar panel connector.

A third object of the present invention is directed to the above solar panel connector configured for attachment to a solar panel, where the solar panel connector is slidably connectable to the particularly designed support connector mentioned above.

PRIOR ART

Solar farms having a plurality of photovoltaic solar panels supported on trackers are widely known. The photovoltaic solar panels are attached to the trackers, and the trackers have a mechanism capable of orienting the solar photovoltaic panels towards the sun at daytime as the sun moves through the sky. Nowadays, the connection between the sun-following trackers and the photovoltaic solar panels is carried out by screwing, riveting and the like. More particularly, a peripheral flange of the photovoltaic solar panels is screwed or riveted into respective holes provided in a corresponding frame of the tracker. Employing this type of connection means is disadvantageous for a number of reasons.

A first drawback of the invention is connected to the fact that screwing or riveting the photovoltaic solar panels is very time consuming, particularly considering that solar farms can have very large numbers of photovoltaic solar panels i.e. hundreds of photovoltaic solar panels. Thus, the time needed to set up a solar farm rises, and therefore so does the cost of the solar farm.

A further drawback of this connection means is that the attachment between tracker and panel is carried out in specific points along the periphery of the solar panel. Accordingly, the stress supported by the solar panel e.g. caused by the wind, is transmitted towards the tracker only through said specific points where the screws or rivets are located. For this reason, particular screws or rivets may come out under certain atmospheric conditions.

Therefore, there is still a need in this field for an improved system for attaching a photovoltaic solar panel to a tracker in a solar farm.

SUMMARY OF THE INVENTION

The drawbacks disclosed above are solved in the present invention by providing a system formed by a support connector and a solar panel connector attachable to the support connector. Further, the present invention is also directed to said support connector and to said solar panel connector.

In the present document, the term "solar panel" refers to any solar device capable of converting solar energy into thermal energy (thermal solar panel) or electrical energy (photovoltaic solar panel).

In the present document, the term "support" or "support structure" refers to any mechanical device designed for supporting one or more solar panels. The support structure may be static or, alternatively, it may take the form of a solar tracker capable of orienting the solar panels towards the sun.

In the present document, the terms "horizontal", "vertical", "upper", "lower", and the like must be interpreted as referring to a configuration where the solar panel is oriented vertically upwards.

In the present document, the term "solar assembly" refers to an assembly comprising the solar panel appropriately attached to the support.

1. System for Attaching a Solar Panel to a Support

A first aspect of the present invention is directed to a system for attaching a solar panel to a support, the system comprising a support connector and a solar panel connector. These two parts are disclosed in more detail below.

Support Connector

The support connector is configured for attachment to a support. The attachment between support connector and support can be carried out in any conventional manner. For example, as disclosed in more detail with reference to the drawings in the present document, the support connector can be clamped to a part, e.g. a beam or bar, of the support.

Further, the present support connector comprises an essentially U-shaped profile having a horizontal lower wall and two parallel vertical side walls. An upper end of the parallel vertical side walls is bent inwards to provide vertical rails for slidably receiving a panel connector according to the present invention. Thus, as disclosed in more detail below, the panel connector can be slidably attached to the vertical rails of the support connector.

In a particular embodiment of the support connector, the vertical rail comprises a downward projection for blocking the sliding movement of the panel connector of the present invention. Thus, when the panel connector slides along the vertical rails of the support connector, it is forced to stop when abutting against the downward projection. The downward projection can be a point projection having e.g. a rectangular shape.

The position of the downward projection in the vertical rail of the support depends on the final position desired for the solar connector. In case the support connector receives a single solar panel, the downward projection can be located at an end of the vertical rail. However, in a particularly preferred embodiment of the invention, the downward projection is located at a longitudinally central portion of the vertical rail. Thus, as disclosed more clearly in connection with the figures further down in the present document, two solar connectors can be attached to each support connector in this case.

Solar Panel Connector

The solar panel connector is configured for attachment to a solar panel. More specifically, the attachment is carried out by means of sliding the solar panel into a C-shaped portion disclosed below. In particular, the solar panel connector comprises a profile having:

a) An upper C-shaped portion configured for receiving a side edge of a solar panel. The C-shaped portion comprises a lower wall, a side wall, and an upper wall, thus having a shape similar to a C where there is an open side (not necessarily the right side as in the letter C). The open side is designed for receiving a side edge of a solar panel. The solar panel then rests against the lower wall and is clamped by the upper wall, which may be somewhat elastic for clamping the solar panel. An adhesive e.g. silicone is employed for attaching the solar panel inside the C-shaped portion.

b) A lower, upwardly oriented channel portion configured for receiving a vertical rail of the support connector disclosed above. In particular, the upwardly oriented channel comprises a first vertical side wall, a lower horizontal wall, and a second vertical side wall, where the length of the first vertical side wall is smaller than the length of the vertical rail of the support connector. Naturally, the lower wall of the C-shaped portion is located above the channel portion, and the distance between the lower horizontal wall of the channel portion and the lower wall of the C-shaped portion matches the length of the vertical rail of the support connector, so that said vertical rail cannot exit the channel portion. Then, the solar panel connector can be attached to the support connector by having the upwardly oriented channel of the solar panel connector slidingly receive the vertical rail of the support connector.

c) At least one box-shaped portion connecting the upper C-shaped portion and the lower channel. For example, the at least one box-shaped portion could simply take the form of a single rectangular-shaped portion joining the upper C-shaped portion and the lower, upwardly oriented channel. However, other structures having a plurality of box-shaped portions interconnected together and having dedicated functions are possible.

This system thus allows for a connection between the solar panel connector and the support connector. The solar panel connector can slide into the support connector by having the vertical rails of the support connector slide along the upwardly oriented channel of the panel connector. However, there still a need for blocking the solar connector into the support connector such that the solar connector can't come out of the support connector. Ideally, the blocking mechanism must be simple, fast and reliable.

In a further preferred embodiment, the system of the invention comprises a dedicated locking mechanism for locking the solar panel connector to the support connector when the solar panel connector reaches an inner position along the support connector. In a particularly preferred embodiment, said locking mechanism comprises a protruding elastic portion provided in one of the solar panel connector and the support connector, and a hole provided in the other of the solar panel connector and the support connector, said protruding elastic portion and hole being located such that the protruding elastic portion enters into said hole when the solar panel connector reaches the inner position.

Many configurations meeting the above requirements are possible. However, two particular embodiments are disclosed in the present document.

In a first particular embodiment, the locking mechanism comprises the following cooperating means respectively located in the support connector and the panel connector:

Support connector: The vertical rail of the support connector comprises a downward protruding, upwardly elastic portion located at a longitudinally end portion of the support connector. Particularly, a lower edge of the elastic portion forms a downward slope with respect to the horizontal lower edge of the vertical rail such that the elastic portion is displaced upwards by a lower horizontal wall of the lower channel portion of the panel connector when the solar panel connector slides into the vertical rails. Naturally, in case the support connector has a downward projection at a first end of the vertical rails, the elastic portion is located in a second end opposite said first end.

Panel connector: The lower horizontal wall of the lower channel portion of the panel connector comprises a first end hole configured for receiving the lower edge of the elastic portion of the vertical rail of the support connector when the solar panel connector reaches the inner position. Therefore, when the panel connector is completely inserted into the vertical rails of the support connector, the elastic portion enters the first end hole present in the trailing edge of the panel connector, thus locking said panel connector in position.

Therefore, when combined with the downward projection, the elastic portion blocks the panel connector in a particular position along the support. In particular, the panel connector is inserted along the vertical rails at the end where the elastic portion is located. The lower horizontal wall of the panel connector first pushes the elastic portion upwards against the elastic force and, when the elastic portion no longer protrudes downwardly from the vertical rail, the panel connector advances along the vertical rail. Finally, the leading end of the panel connector bumps into the downward projection and, at the same time, the elastic portion enters into the first hole provided near the trailing end of the panel connector. The panel connector is thus locked in position, and it cannot be extracted from the support connector unless the elastic portion is pushed upwards manually.

In a second, alternative embodiment to the above, the locking mechanism comprises the following cooperating means respectively located in the support connector and the panel connector:

Support connector: An essentially horizontal wall connecting the vertical rail to the side walls of the support connector comprises an upward protruding, downwardly elastic portion located at a longitudinally end portion of the support connector. More particularly, an upper edge of the elastic portion forms an upwards slope with respect to the horizontal wall, such that the elastic portion is displaced downwards by a horizontal wall located above the lower channel portion of the panel connector when the solar panel connector slides into the vertical rails.

Panel connector: The horizontal wall located above the lower channel portion of the panel connector comprises a second end hole configured for receiving the downwardly elastic portion of the horizontal wall when the solar panel connector reaches the inner position.

The operation of this alternative locking mechanism is equivalent to that disclosed above, the only relevant difference being the position of the cooperating means. In the present case, the elastic portion protrudes upwardly from the horizontal wall connecting the vertical rail to the side walls of the support connector. Correspondingly, the second hole is located at the horizontal wall located above the channel portion of the panel connector. Thus, when the panel connector is inserted along the vertical rails, the horizontal wall located above the lower channel portion first pushes the elastic portion downwards against the elastic force and, when the elastic portion no longer protrudes upwardly, the panel connector advances along the vertical rail. Finally, the leading end of the panel connector bumps into the downward projection and, at the same time, the elastic portion enters into the second hole provided near the trailing end of the panel connector. The panel connector is thus locked in position, and it cannot be extracted from the support connector unless the elastic portion is pushed downwards manually.

In this respect, note that while the locking mechanisms disclosed above are located at an end portion of the respective connectors, other positions along the support and panel connectors are possible. For example, the locking mechanisms may be provided at a middle portion of the support and panel connectors.

Now, the system of the invention works as follows. First, the support connector is attached to the support and the solar panel is attached to the panel connector. The attachment between the support connector and the support can be carried out in any conventional manner e.g. by means of clamps. The attachment of the solar panel to the panel connector is carried out by introducing a side edge of the solar panel into the C-shaped upper portion of the panel connector, such that said side edge of the panel is clamped by the upper and lower walls of the C-shaped portion and fixed with an adhesive. Then, the panel connector is attached to the support connector by pushing the panel connector into the support connector such that the vertical rail of the support connector enters into the lower, upwardly oriented channel portion of the panel connector. The vertical rail, trapped between the channel portion and the lower horizontal wall of the C-shaped portion, slides inwards until it reaches the locking mechanism. The position of the panel connector inside the support connector is then locked. The panel connector, and therefore also the solar panel itself, is then locked in position.

This system is advantageous in that the attachment between the solar panel and the support is carried out in a very simple way. Further, since no screws, bolts, or rivets are required, this connection system is not also very fast, but it also requires less tools and personnel in comparison with the prior art systems.

A further advantage of the present system is that any mechanical stress arising from the charge of the wind or the like spreads along the whole connection line between support and panel. This is more efficient than having a restricted number of point connections where mechanical stress concentrates.

A further preferred embodiment of the invention is directed to a solar assembly comprising a solar panel and a support attached by means of the above system.

2. Support Connector

A second aspect of the present invention is directed to a support connector.

3. Solar Panel Connector

A third aspect of the present invention is directed to a solar panel connector.

DESCRIPTION OF A PREFERRED EMBODIMENT

Figure 1:
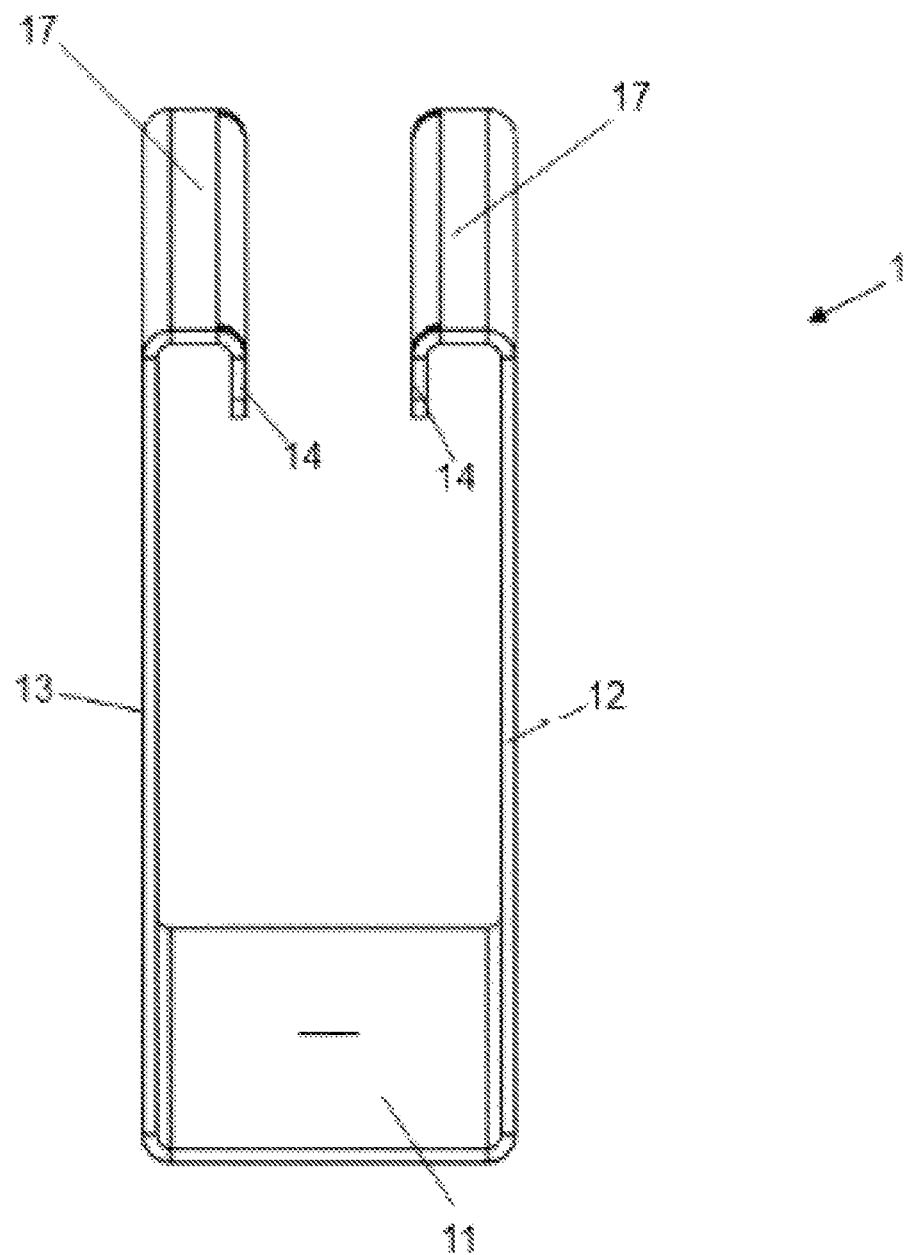
FIG. 1 shows a front view of a support connector according to the present invention.

The system for attaching a solar panel (100) to a support (200) is now disclosed with reference to the attached drawings. As disclosed above, the system of the invention comprises a support connector (1) and a solar panel connector (2) attachable to said support connector (1). Further, note that the present example is particularly directed to the connection between a solar tracker and a solar panel. Therefore, in the following the "support (200)" and the "support connector (1)" are referred to as "solar tracker (200)" and "tracker connector (1)".

Figure 2:
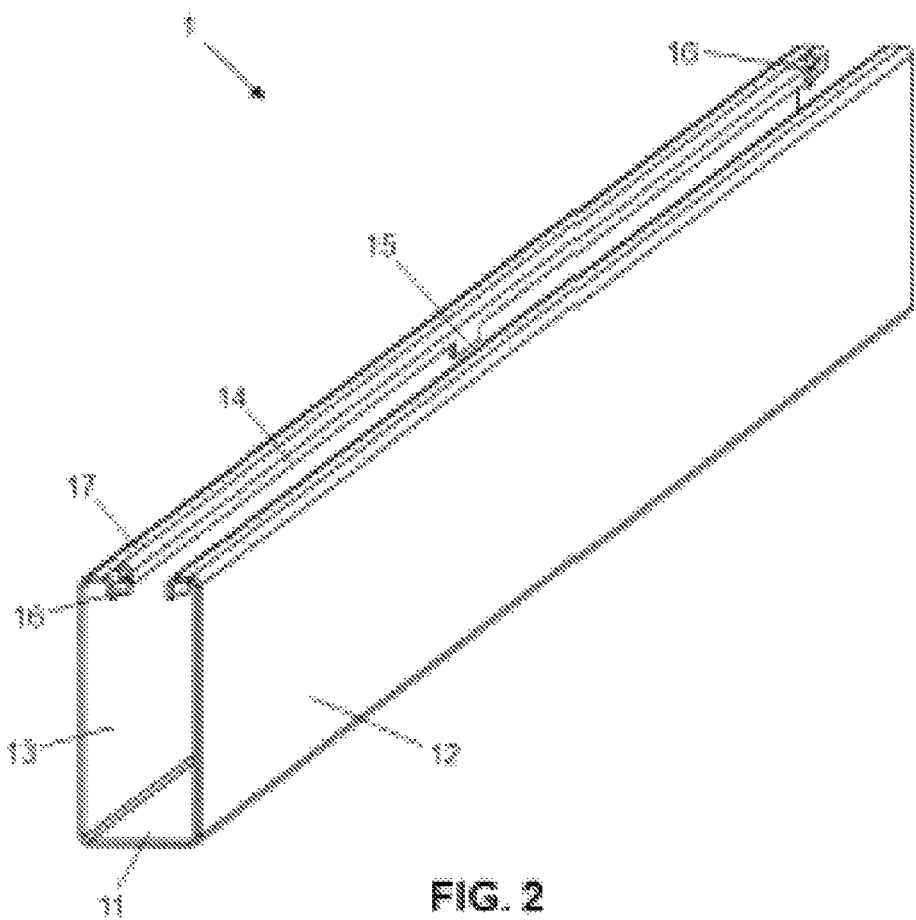
FIG. 2 shows a perspective view of a support connector according to the present invention.
Figure 3:
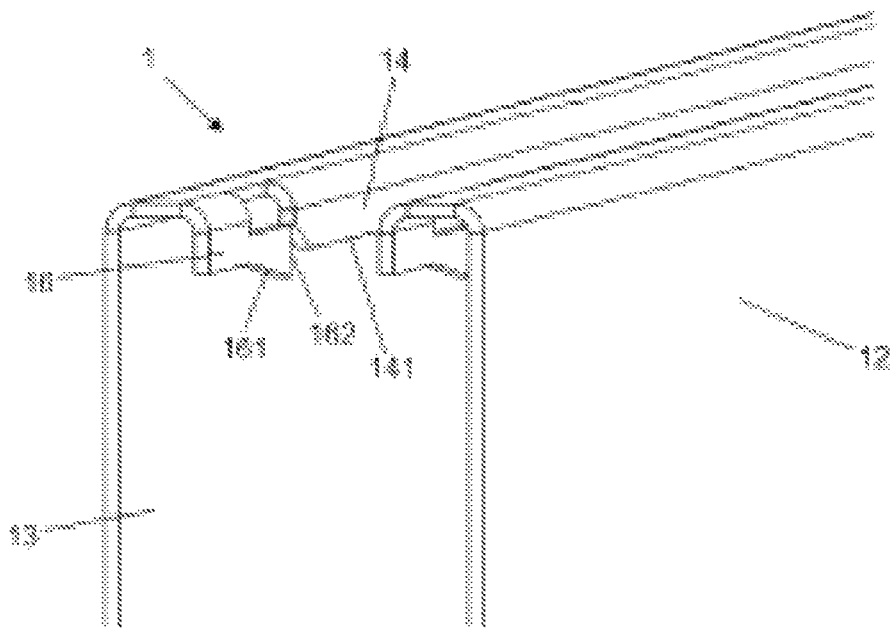
FIG. 3 shows an enlarged perspective view of a portion of the support connector according to the invention.

FIGS. 1-3 show respective views of the tracker connector (1) of the invention. The tracker connector (1) takes the form of an essentially U-shaped profile formed by a lower horizontal wall (11) and two parallel vertical side walls (12, 13). The upper ends of the side walls (12, 13) are curved inwards, i.e. towards the inside of the U-shaped profile, for forming respective vertical rails (14). In the present example, the curved portion of the side walls (12, 13) comprises an essentially horizontal wall (17) connecting the vertical rail (14) to the side walls (12, 13). The edges between the respective walls are rounded.

The tracker connector (1) shown in the figures further comprises a downward projection (15) emerging downwardly from the horizontal lower edge (141) of the vertical rail (14) for blocking the sliding advancement of a solar panel connector (2). The downward projection (15) is located longitudinally in the middle of the vertical rail (14), so that two solar panel connectors (2) can be attached to each tracker connector (1).

The tracker connector (1) further comprises a downward protruding, upwardly elastic portion (16) located at respective longitudinal ends of the vertical rail (14). Particularly, each elastic portion (16) comprises a lower edge (161)

forming a downward slope with respect to the horizontal lower edge (141) of the vertical rail (14) in the direction of insertion of the solar panel connector (2). Further, said elastic portion (16) comprises an essentially vertical side edge (162) of oriented towards the direction of extraction of the solar panel connector (2). Thus, when the solar panel connector (2) is inserted in the vertical rail (14) of this tracker connector (1), the inclined lower edge (161) is displaced upwards so that the panel connector (2) can slide into the tracker connector (1). On the contrary, when the panel connector (2) reaches an inner position, a first hole provided therein (see description below) allows the lower edge (161) to return to its lower position. Then, the vertical side edge (162) blocks any outward displacement of the panel connector (2), which is then locked in said inner position.

Figure 4:
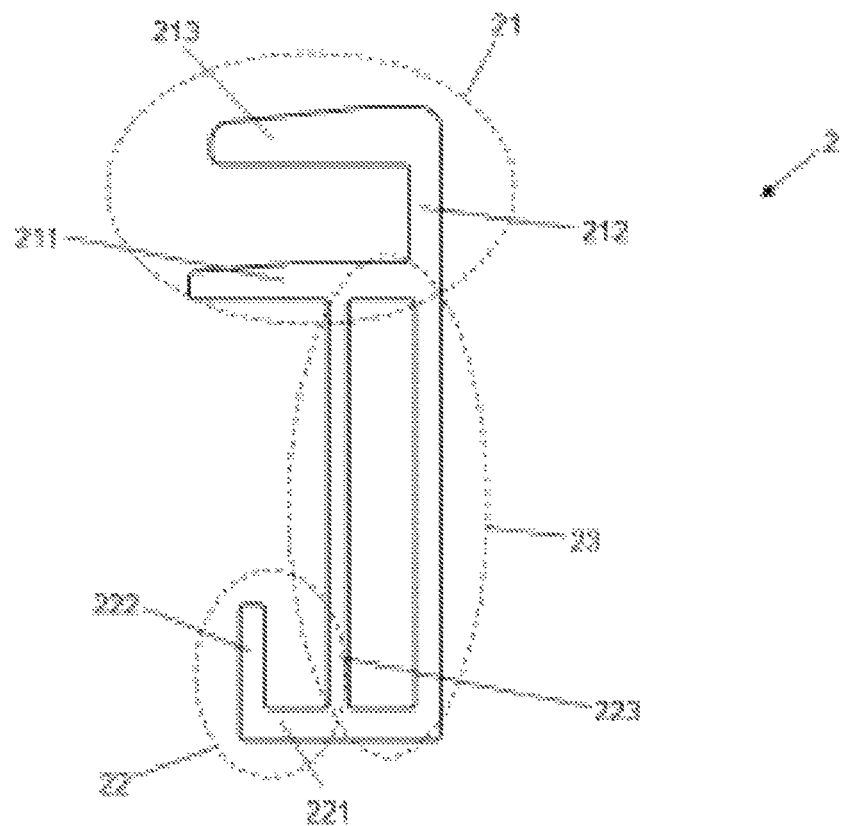
FIG. 4 shows a front view of a solar panel connector according to the present invention.
Figure 5:
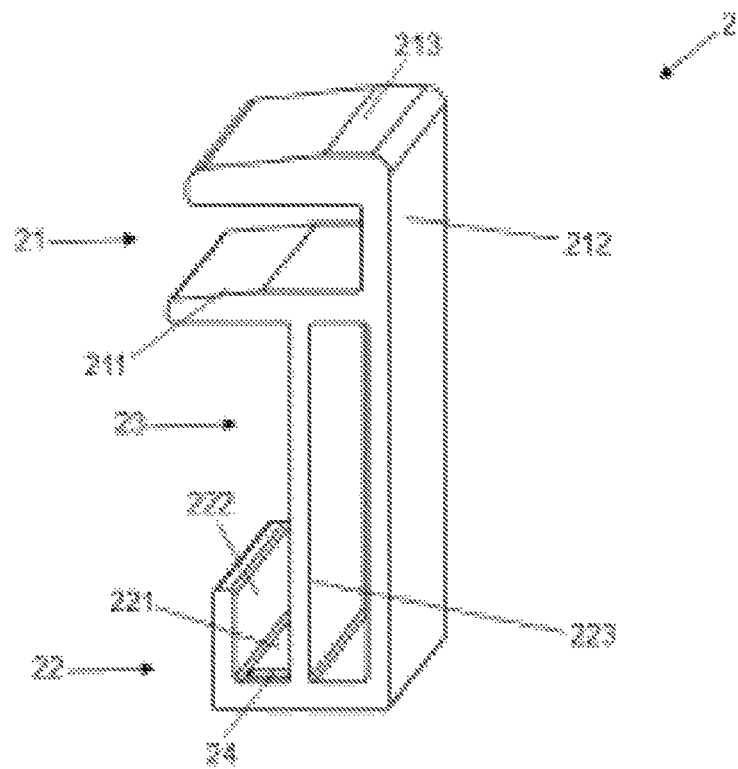
FIG. 5 shows a perspective view of a solar panel connector according to the present invention.

FIGS. 4 and 5 show respective views of the solar panel connector (2) according to the present invention. The solar panel connector (2) takes the form of a profile having a shape formed by three distinct portions: an upper C-shaped portion (21), a lower channel portion (22), and a box-shaped portion (23) connecting the C-shaped portion (21) and the lower channel portion (22).

The C-shaped portion (21) is configured for clamping a side edge of a solar panel (100). Thus, the C-shaped portion (21) has an essentially horizontal lower wall (211), an essentially horizontal upper wall (213), and a vertical side wall (212) connecting the lower wall (211) and the upper wall (213), these three walls thus taking a C shape open towards the side. In this example, the lower wall (211), the side wall (212), and the upper wall (213) are essentially straight. However, other shapes are possible.

The lower channel portion (22) forms an upwardly open channel having a horizontal lower wall (221), a first vertical side wall (222) and a second vertical side wall (223). In this example, the second vertical side wall (223) has an upper end connected to the box-shaped portion (23), while the first side wall (222) is shorter, such that the upward open channel can be accessed laterally. This lower channel portion (22) is dimensioned for engaging with the vertical rail (14) of the solar tracker (1). That is, the vertical rail (14) of the solar tracker (1) fits inside the lower channel portion (22) such that the solar panel connector (2) can slide into the tracker connector (1). This means, in particular, that the distance between the lower horizontal wall (221) of the channel portion (22) and the lower wall (211) of the C-shaped portion, located above said channel portion (22), matches the length of the vertical rails (14) of the tracker connector (1), so that said vertical rail (14) cannot exit the channel portion (22). Thus, as explained above, upon entering the vertical rail (14), the upper end surface of the lower horizontal wall (222) bumps into the inclined lower edge (161) of the elastic portion (16) and, upon a simple pushing action by an operator, displaces said elastic portion (16) upwards. The solar panel connector (2) can then slide further until, when reaching the inner position, a longitudinally leading end thereof bumps into the downward projection (15) of the vertical rail (14) located in the middle portion of the tracker connector (1). At the same time, a first end hole (24) located at the lower wall (221) of the lower channel portion (22) near a longitudinally trailing end of the solar panel connector (1) reaches the position of the elastic portion (16) of the vertical rail (14). The elastic portion (16) then returns to its original lower position by entering into said first end hole (24). The vertical side edge (162) of the elastic portion (16) then blocks any outward displacement of the solar panel connector (1), which then is locked in the inner position.

In the present example, the box-shaped portion (23) of the solar panel connector (23) is merely formed by a vertically oriented rectangle located between the C-shaped portion (21) and the channel portion (22), where part of the second vertical side wall (223) of the channel portion (22) also forms a side wall of the rectangle.

Figure 6:
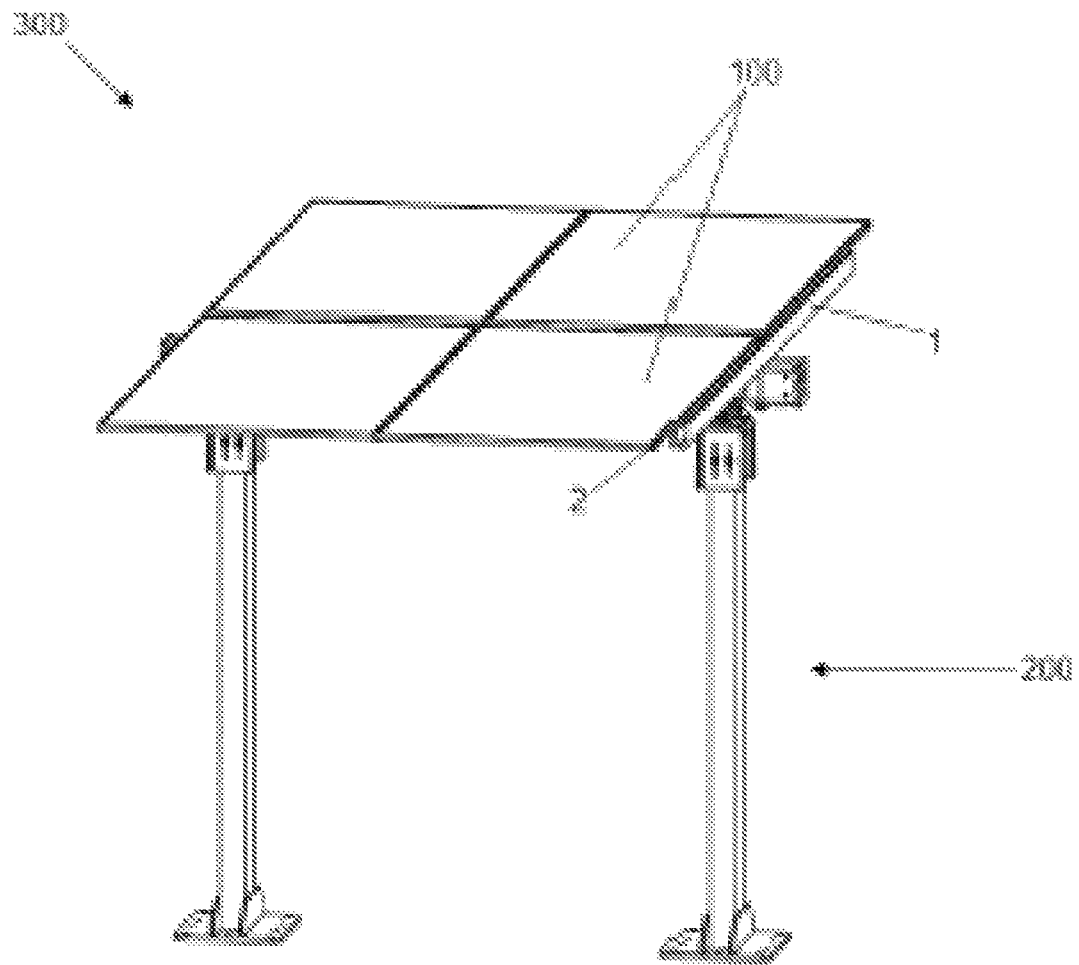
FIG. 6 shows a perspective view of a solar assembly comprising a support connector and a panel connector according to the present invention.

FIG. 6 shows a solar assembly (300) formed by a solar tracker (200) having four solar panels (100) attached thereto. The attachment of the solar panels (100) is carried out by a system according to the invention comprising two tracker connectors (2) fixed to four solar panel connectors (1). The connection system is shown in greater detail in FIGS. 7 and 8.

Figure 7:
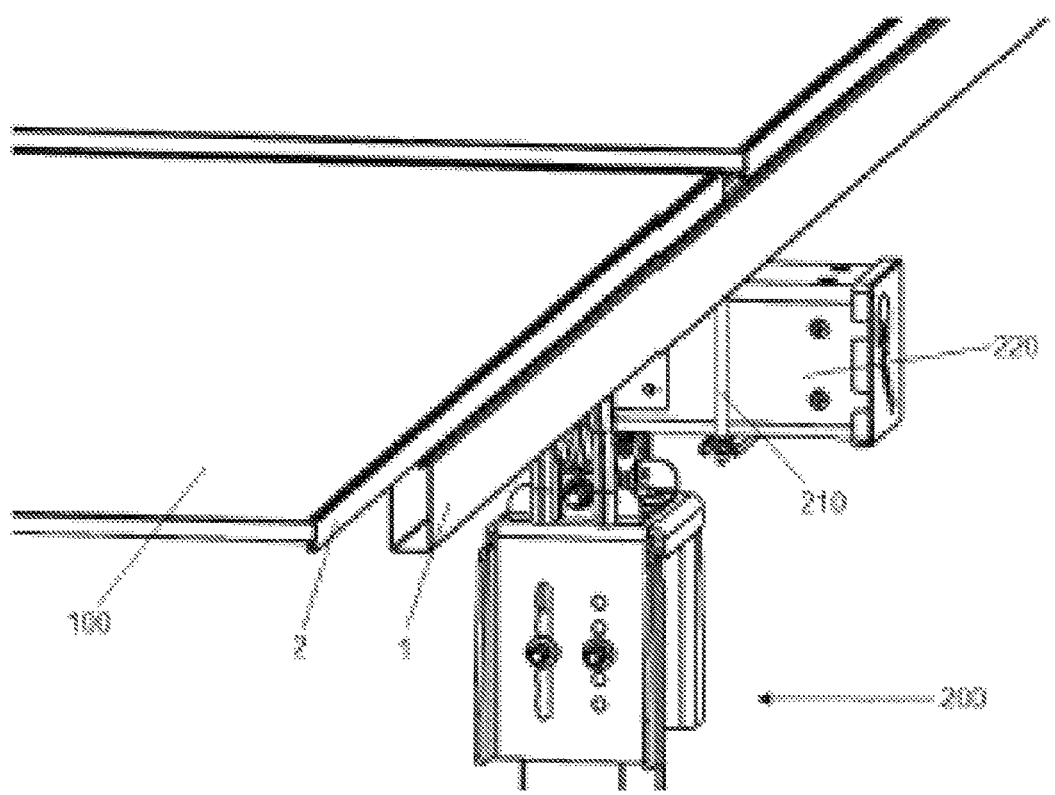
FIG. 7 shows an enlarged perspective view of a portion of the solar assembly of FIG. 6 showing the support connector and the panel connector.
Figure 8:
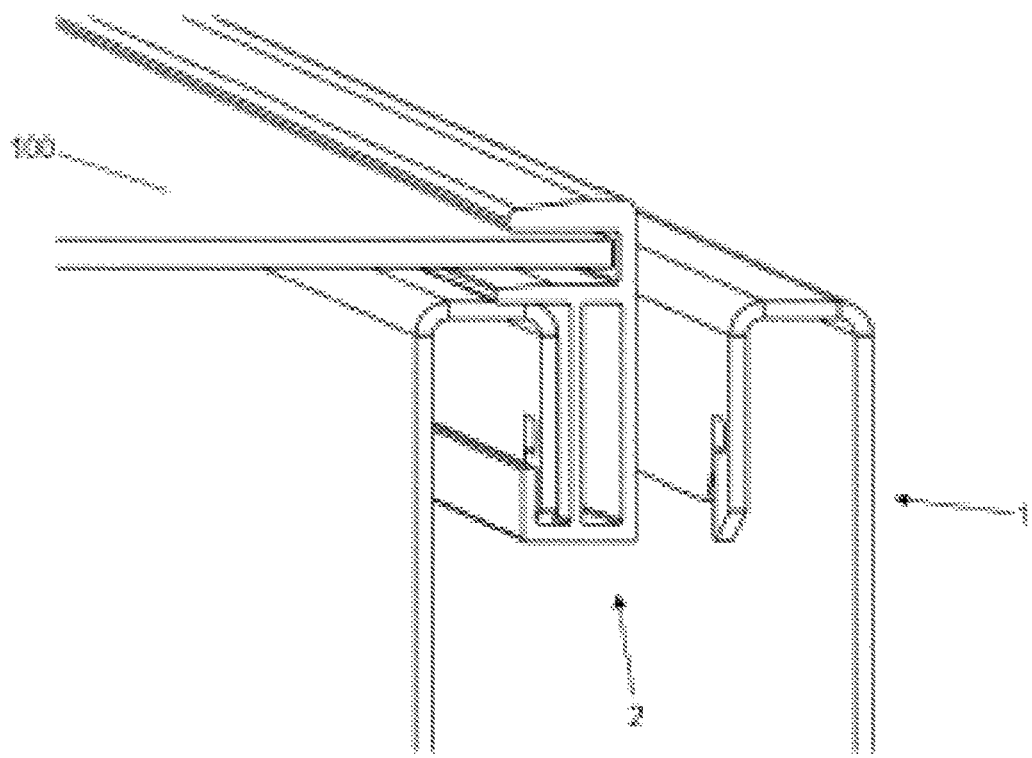
FIG. 8 shows a further enlarged perspective view of the portion of the solar assembly shown in FIG. 6.

As shown therein, the solar panel (100) is clamped between the upper wall (213) and the lower wall (211) of the C-shaped portion (21) of the solar panel connector (2), while the tracker connector (1) is attached to the solar tracker (200) by means of a clamp (210) connected to a horizontal beam (220) thereof. In turn, the connection between the solar panel connector (2) and the tracker connector (1) is carried out as explained above. Specifically, FIGS. 7 and 8 show how the C-shaped portion (21) of the panel connector (2) is attached to the vertical rail (14) of the solar tracker (1) by sliding the solar panel connector (2) into the tracker connector (1). The solar panel connector (2) is locked in position, at one end thereof, by means of the downward projection (15) and, at the opposite end thereof, by cooperation between the elastic portion (161) of the tracker connector (1) and the end hole (24) of the panel connector (2).

What is claimed is:

1. A system for attaching a solar panel to a support, the system comprising:
    a support connector configured for attachment to a support and a solar panel connector configured for attachment to a solar panel;
    wherein the support connector comprises an essentially U-shaped profile having a horizontal lower wall and two parallel vertical side walls;
    wherein an upper end of the parallel vertical side walls is bent inwards to provide vertical rails for slidably receiving the solar panel connector;
    wherein the solar panel connector comprises a profile comprising
        an upper C-shaped portion configured for receiving a side edge of a solar panel;
        a lower, upwardly oriented lower channel portion configured for receiving the vertical rail of the support connector; and
        at least one box-shaped portion connecting the upper C-shaped portion and the lower channel portion;
    wherein the vertical rail comprises a downward projection for blocking the sliding movement of the panel connector; and
    wherein the downward projection is located in a longitudinally central portion of the vertical rail.

2. The system for attaching a solar panel to a support according to claim 1, further comprising a dedicated locking mechanism for locking the solar panel connector to the support connector when the solar panel connector reaches an inner position along the support connector.

3. The system for attaching a solar panel to a support according to claim 2, wherein the locking mechanism comprises a protruding elastic portion provided in one of the connectors of the solar panel and the support connector, and a hole provided in the other of the solar panel connector and the support connector, said protruding elastic portion and the hole being located such that the protruding elastic portions enters said hole when the solar panel connector reaches the inner position.

4. The system for attaching a solar panel to a support according to claim 3,
- wherein the vertical rail of the support connector comprises a downward protruding, upwardly elastic portion located at a longitudinally end portion of the support connector,
- wherein a lower edge of the downward protruding, upwardly elastic portion forms a downward slope with respect to the horizontal lower edge of the vertical rail such that the downward protruding, upwardly elastic portion is displaced upwards by a lower horizontal wall of the lower channel portion of the panel connector when the solar panel connector slides on the vertical rails; and
- wherein the lower horizontal wall of the lower channel portion of the panel connector comprises a first end hole configured for receiving the lower edge of the downward protruding, upwardly elastic portion of the vertical rail of the support connector when the solar panel connector reaches the inner position.

* * * * *